(12) United States Patent
Obrist

(10) Patent No.: US 11,703,414 B2
(45) Date of Patent: Jul. 18, 2023

(54) METHOD FOR DETECTING A LEAK IN A LINE SYSTEM AND CONTROL SYSTEM FOR CARRYING OUT THE METHOD

(71) Applicant: OBLAMATIK AG, Chur (CH)

(72) Inventor: Roland Obrist, Scharans (CH)

(73) Assignee: OBLAMATIK AG, Chur (CH)

( * ) Notice: Subject to any disclaimer, the term of this patent is extended or adjusted under 35 U.S.C. 154(b) by 155 days.

(21) Appl. No.: 17/421,281

(22) PCT Filed: Jan. 28, 2019

(86) PCT No.: PCT/EP2019/051959
§ 371 (c)(1),
(2) Date: Jul. 7, 2021

(87) PCT Pub. No.: WO2020/156628
PCT Pub. Date: Aug. 6, 2020

(65) Prior Publication Data
US 2022/0065729 A1 Mar. 3, 2022

(51) Int. Cl.
*G01M 3/28* (2006.01)

(52) U.S. Cl.
CPC ............... *G01M 3/2815* (2013.01)

(58) Field of Classification Search
CPC ... G01M 3/00; G01M 3/26–28; G01M 3/2815
See application file for complete search history.

(56) References Cited

U.S. PATENT DOCUMENTS

| 3,962,905 A * | 6/1976 | Jouve ................. G01M 3/2815 |
| | | 73/40.5 R |
| 2016/0263413 A1 | 9/2016 | Wagner |
| 2020/0158595 A1* | 5/2020 | Winterholler ........... F04B 51/00 |

FOREIGN PATENT DOCUMENTS

| DE | 102010050505 A1 * | 5/2012 | ............. A62C 37/50 |
| DE | 102010050505 A1 | 5/2012 | |
| EP | 3401659 A1 | 11/2018 | |
| GB | 2553833 A | 3/2018 | |

OTHER PUBLICATIONS

International Search Report for corresponding PCT application No. PCT/EP2019/051959, dated Oct. 24, 2019.

\* cited by examiner

*Primary Examiner* — Nguyen Q. Ha
(74) *Attorney, Agent, or Firm* — Notaro, Michalos & Zaccaria P.C.

(57) ABSTRACT

A method for detecting a leak in a line system having a distribution line where the first end can be closed by a first valve and at the second end of which at least one consumer is arranged, a pressure sensor by means of which the pressure in the distribution line can be ascertained, and at least one second valve wherein at least one second valve is arranged between the pressure sensor and at least one of the consumers is disclosed. The method contains the steps of a) closing the first valve, b) ascertaining a first pressure reduction rate (PR1); c) closing the at least one second valve; d) ascertaining a second pressure reduction rate (PR2); and e) determining the region of the leak on the basis of the ascertained pressure reduction rates (PR1, PR2).

20 Claims, 1 Drawing Sheet

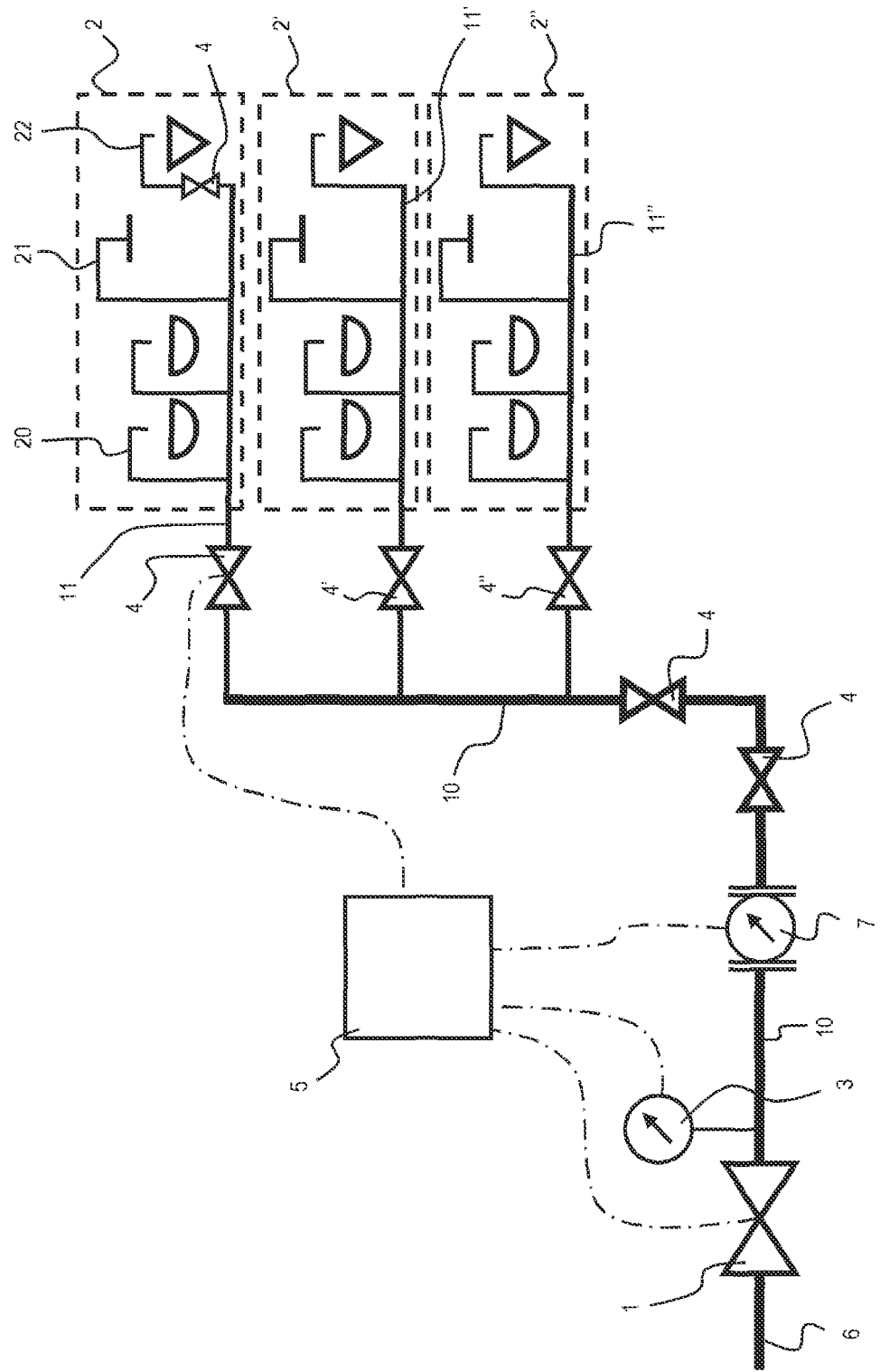

METHOD FOR DETECTING A LEAK IN A LINE SYSTEM AND CONTROL SYSTEM FOR CARRYING OUT THE METHOD

FIELD OF THE INVENTION

The present invention relates to a method for detecting a leak in a line system, and to a control system for carrying out the method. Water damage is to be avoided by the invention. In particular in such a way that the location of the leak can be determined.

DESCRIPTION OF THE PRIOR ART

A large number of water pipes are regularly laid in buildings, leading from a liquid source, such as a public water supply network, to various consumers, such as sanitary fittings, dishwashers or washing machines. Leaks can occur on these liquid lines, for example in the form of pipe breaks or cracks, through which liquid can escape. The leaking liquid can cause major damage to the building, a masonry and/or to facilities of the building at the points of leak.

For this reason, a large number of methods for detecting leaks in liquid lines are already known. For example, flow sensors can be used to detect leaks with large liquid outflows, such as those that occur when pipes burst. The flow sensors used here require a very large measuring range of up to 100 L/min (liters per minute).

As a result, the flow sensors are not suitable for determining small liquid leaks, especially those of less than 0.7 L/min, such as occur in drip leaks. Such drip leaks can therefore remain undetected for a long time, so that the escaping liquid can cause considerable damage, for example through mold growth.

To detect drip leaks, methods are therefore known in which a pressure drop in the liquid lines caused by drip leaks is measured over a longer period. In these measurement methods, the liquid lines must be closed with a valve for a longer period of time (e.g. 15 minutes), for example, so that the course of a pressure in the liquid lines can be measured during this time. If a consumer of the liquid in the building is activated during the measurement of the pressure drop, the liquid lines must be reopened immediately so that a liquid supply to the consumers is possible without delay. This thus leads to a termination of the measurement procedure, so that it has to be repeated at a later point in time. Furthermore, the consequence of this is that leaks with liquid discharge in a certain range, in particular 0.3 L/h to 0.7 L/min, cannot be detected with these methods, because drip leaks with liquid discharges in this range cannot be distinguished from (low) liquid withdrawals by consumers. This means that a leak with liquid discharges in the range always leads to a termination of the measurement procedure. Thus, the known methods are only suitable for the detection of drip leaks with liquid discharges in the range of up to 0.3 L/h.

EP 3 401 659 discloses a method for detecting a leak in a liquid line, with which drip leaks can be detected in a larger range, wherein it can also only be determined with this method that a leak is present. The leak can therefore be anywhere in the liquid line. After performing such a procedure, the entire length of the liquid line must be searched for the leak. This is time-consuming and incurs maintenance costs.

DESCRIPTION OF THE INVENTION

It is an object of the present invention to provide a method for detecting a leak in a line system, as well as a control system for carrying out the method, which allow an allocation of the leak.

This object is solved by a method with the features of claim 1. Further embodiments of the method, as well as of a control system for carrying out the method, are defined by the features of further claims.

A method according to the invention for detecting a leak in a line system having a distribution line, the first end of which can be closed with a first valve and at the second end of which at least one consumer is arranged, having a pressure sensor, with which the pressure in the distribution line can be determined, and having at least one second valve, wherein at least one second valve is arranged between the pressure sensor and each consumer, comprises the steps of:
a) closing the first valve;
b) determining a first pressure reduction rate;
c) closing the at least one second valve;
d) determining a second pressure reduction rate;
e) determining the region of the leak based on the determined pressure reduction rates.

When the at least one second valve closes, the line system, i.e. from the first valve to the at least one consumer, is under a certain pressure. This pressure can be determined with the pressure sensor. The determined pressure corresponds to that in the distribution line if only one tapping point is provided in the consumer and corresponds to the pressure of the entire system if several consumers and/or several tapping points are provided in a consumer when all second valves are open.

If there is no water withdrawal at the consumer and if there is no leak in the system, this pressure remains constant for a longer time or decreases only slightly. For example, a pressure drop of less than 0.1 bar over a period of 10 minutes can be considered to indicate that there is no leak. More generally, a first threshold value may be established for a system below which the system is considered to have no leak and a second threshold value may be established above which the system is considered to have a leak. The first threshold value and the second threshold value may span a range of, for example, 0 bar to 0.5 bar, or the two threshold values may be identical and form a sharp boundary. Since a minimum pressure drop must be expected in a real line system, a real range of threshold values is between 0.1 bar and 0.5 bar. The threshold values can vary from system to system and depend, for example, on the line lengths or the number of consumers. They can also be different in different sections of a line system. If there is a leak, water will leak out of the line system and the pressure inside will decrease. To determine a pressure reduction rate, the pressure prevailing in the distribution line is recorded over a predetermined duration. For example, the determination may be made over a duration greater than 5 minutes, such as 5 to 15 minutes, such as 10 minutes. The pressure to be determined may be in a range of 0 to 10 bar, for example 0.1 to 8 bar, for example 0.2 to 6 bar, for example 0.3 to 3 bar. For example, drinking water lines are under a pressure of 3 bar and compressed air lines are under a pressure of 6 to 8 bar. From the evaluation of the pressure reduction rate before the closing of the at least one second valve and after the closing of the at least one second valve, it can be determined whether the leak is located upstream or downstream of the second valve in the flow direction.

In one embodiment, the range is determined such that the leak is downstream of the at least one second valve when the first pressure reduction rate is greater than zero and the second pressure reduction rate is zero, and wherein the leak is upstream of the at least one second valve when the first pressure reduction rate and the second pressure reduction rate are greater than zero. This applies to one second valve, but also to any number of second valves.

In an embodiment in which two or more consumers and two or more second valves are provided in the line system, wherein at least one second valve is provided between the pressure sensor and each consumer, the method comprises the steps of:
f) closing another of the second valves after determining the second pressure reduction rate;
g) determining a third pressure reduction rate before determining the region of the leak.

For example, the line system comprises a distribution line, which is designed as a riser line in a building and supplies several floors with tap water. A second valve is provided on each floor. A consumer line is connected to each of the second valves, which is connected to one or more consumers. Thus, such a method can be used to determine whether the leak is located on one of the floors or whether the leak is located in the riser line.

In one embodiment, the region is determined such that the leak is located downstream of the further second valve if the previously determined pressure reduction rates are greater than zero and the third pressure reduction rate is zero, and wherein the leak is located upstream of the further second valve if all pressure reduction rates determined up to that point are greater than zero. For example, if it is determined that the pressure reduction rate is zero after the second valve of the first floor closes, the leak must be located downstream of the second valve of the first floor.

In one embodiment, the method is terminated when the determined first pressure reduction rate is zero. If the first pressure reduction rate is zero, no leak can be present and thus the execution of the subsequent method steps can be dispensed with.

In one embodiment, the previously closed valve is reopened and closed again when the determined pressure reduction rate exceeds a predetermined value. Large pressure reduction rates indicate intentional water withdrawal. Pressure reduction rates of, for example, more than 1 bar during the determination period indicate a water withdrawal. There are also differences in the large pressure reduction rates, which are above the second threshold value. For example, washing hands results in a lower pressure reduction rate than, for example, showering. The method can be stopped when the second threshold value is exceeded to avoid that no water is available to the users of the system.

The pressure reduction rates can be different for differently designed systems. The pressure reduction rates in different areas of a system may also be different. For example, the pressure reduction rate may depend on the volume of water included in the system. Accordingly, the first and second threshold values may also be dependent on the volume of water included in the system. Accordingly, the threshold values may be determined based on the volume of water in the system. Alternatively, the threshold values can be determined by reference measurements subsequent to the installation. Based on the reference measurements, i.e. based on the pressure curve over time, the time periods or durations during which the pressure is to be measured can also be determined in order to obtain meaningful measured values with which a leak can be reliably detected. Alternatively, the threshold values can be determined iteratively with a learning system. For example, an initial determination of a pressure reduction rate can be made over a long duration. Based on this pressure reduction rate, the length of the duration can subsequently be shortened or lengthened. The length of duration may be the same for all sections of the line system, or the durations may be of different lengths. Based on an initial reference measurement in the entire system, or in the individual sections of the system, the durations can be determined.

In one embodiment, the corresponding valve remains open for a predetermined time before closing again. In this way, it can be ensured that no influences of the desired water withdrawal remain on the pressure conditions in the line system.

In one embodiment, a flow sensor is provided in the line system and the predetermined time during which the corresponding valve remains open is determined on the basis of the previously determined flow. With a flow meter, intentional water withdrawals can be determined in particular, since larger amounts of water flow in the pipe system, which can be determined with the flow meter. If, for example, it is determined that a large amount of water is being withdrawn over a longer period of time, the corresponding valve is then left open for longer. If it is determined that a small amount of water is being withdrawn, the valve is left open for a shorter period of time. For example, washing hands requires less water and takes less time than, for example, taking a shower. Alternatively, the time during which a valve remains open can be determined based on the previously determined pressure reduction rate, as a high pressure reduction rate indicates a large water withdrawal and a low pressure reduction rate indicates a low water withdrawal. If the pressure reduction rate is higher, the corresponding valve can be left open longer afterwards.

In one embodiment, the execution of the method takes place in a predetermined period of time. It makes sense to carry out the method in a period of time in which no deliberate water withdrawals are to be expected.

For example, at night, when fewer or no water withdrawals are certainly to be expected. For example, such periods can be determined with a statistical evaluation of the measured values of the flow sensor. Thus, it can be avoided that the method is carried out when water is usually withdrawn from the system.

In one embodiment, the execution of the method takes place at predetermined intervals. The intervals can be evenly or unevenly distributed, i.e. the intervals between the executions of the method can be of equal or different lengths.

Each consumer can comprise at least one tapping point, which is connected to a consumer line, wherein the consumer line is closeable by the second valve and thus separable from the distribution line. Accordingly, one, two or more tapping points may be provided on each consumer line.

In one embodiment, a second valve is arranged upstream of each tapping point and, in each consumer line, the last second valve arranged in each case is closed first and then the second valve following in the direction of the pressure sensor. If, for example, the last second valve of a consumer is closed and the subsequently determined pressure reduction rate is zero, the leak must be in the flow direction after the last second valve, i.e. in the region of the last tapping point.

In one embodiment, several second valves are provided in the distribution line between the at least one consumer and the pressure sensor, and wherein in the distribution line, the second valve arranged last in each case is closed first and then the second valve following in the direction of the pressure sensor is closed. As a result, the distribution line can be divided into segments, which simplifies the allocation of the leak. For example, critical points can be deliberately flanked by two second valves so that this area can be analyzed separately. Critical points can be hard-to-reach locations or they can be locations where leaks are more likely to occur. Valves can also be provided at predetermined distances from each other in the case of long lines in order to be able to determine the location of a detected leak more precisely.

An alternative method for detecting a leak in a line system having a distribution line, the first end of which can be closed with a first valve and at the second end of which at least one consumer is arranged, having a pressure sensor, with which the pressure in the distribution line can be determined, and having at least one second valve, wherein at least one second valve is arranged between the pressure sensor and at least one of the consumers, comprises the steps of:
a) closing all valves;
b) determining a first pressure reduction rate;
c) opening of the at least one second valve;
d) determining a second pressure reduction rate;
e) determining the region of the leak based on the determined pressure reduction rates.

As with the previously described method, the lines or the regions of the system are examined section by section, i.e. the pressure reduction rates of the individual regions are determined one after the other. In contrast to the previously described method, here first all valves are closed and then the second valve adjoining the first valve is opened and then the second valve adjoining this valve.

In one embodiment, the leak is located upstream of the at least one second valve when the first pressure reduction rate is greater than a first threshold, and the leak is downstream of the at least one second valve when the first pressure reduction rate is less than the first threshold and the second pressure reduction rate is greater than the first threshold.

In this method, the determination of the pressure reduction rates of the individual sections, compared to the first method, is carried out in the reverse order.

The methods can be used with any type of line system in which a fluid, i.e. a liquid or a gas, is conveyed.

The mentioned embodiments of the two alternative methods can be used in any combination, provided they do not contradict each other.

A control system according to the invention for detecting a leak in a line system having a distribution line, the first end of which can be closed with a first valve and at the second end of which at least one consumer is arranged, having a pressure sensor, with which the pressure in the distribution line can be determined, and having at least one second valve, wherein at least one second valve is arranged between the pressure sensor and each consumer, wherein the first valve, the at least one second valve and the pressure sensor are connected to a controller, wherein the controller is designed to carry out the method according to one of the preceding claims.

In one embodiment, the connection between the first valve, the at least one second valve, the pressure sensor and the controller is wired or wireless. A combination of wired and wireless connections is also possible. For example, line systems can be easily retrofitted with second valves that can be wirelessly connected to the controller. This means that the retrofitting effort can be kept low. The wireless variant is suitable in the consumer area, since retrofitting sensor lines is usually difficult. In the area of the distribution line, wired valves can be used, since the cable routing there is usually not obstructed by the building structure.

In one embodiment, the control system comprises a display unit with which the region of the leak can be displayed. Thus, a user can easily and quickly find out the location of a leak, thus preventing major water damage. The display unit can be a screen.

In one embodiment, the control system comprises a transmission unit with which information can be transmitted away from or to the control system. This allows remote maintenance of the system, making on-site maintenance unnecessary. In this case, the display unit can also be a remote screen, for example of a computer or a smartphone.

The mentioned embodiments of the control system can be used in any combination, provided that they do not contradict each other.

A valve unit according to the invention for detecting a leak in a line system comprises a first valve and a control system according to any of the preceding embodiments.

In one embodiment, the valve unit comprises a pressure sensor or a pressure sensor and a flow sensor.

BRIEF DESCRIPTION OF THE FIGURES

Exemplary embodiments of the present invention are explained in more detail below with reference to a FIGURE. This is for explanatory purposes only and is not to be construed restrictively, wherein:

FIG. 1 shows a schematic diagram of a line system.

DETAILED DESCRIPTION OF THE INVENTION

FIG. 1 shows a schematic representation of a line system. The line system comprises a distribution line 10, the first end of which can be closed by a first valve 1 and at the second end of which at least one consumer 2, 2' is arranged. A pressure sensor 3 is arranged in the distribution line 10, adjacent to the first valve 1, with which the pressure of the fluid in the distribution line 10 can be determined. The line system comprises several second valves 4, 4', each of which is arranged between the pressure sensor 3 and one of the consumers 2, 2'. The distribution line 10 is separable from a feed line 6 by the first valve 1. A flow sensor 7, with which the flow rate of the liquid in the distribution line 10 can be determined, is arranged adjacent to the first valve 1 in the distribution line 10. In this illustration, the distribution line 10 corresponds to a riser in a building which supplies fluid, for example water, to the individual floors. Each consumer 2, 2' comprises several tapping points 20, 21, 22, which are connected by a consumer line 11 to each other. The consumer line 11 can be separated from the distribution line 10 by the second valve 4. Tapping points are, for example, wash basins 20, showers 21 or toilets 22. In the consumer 2 on the top floor, a further second valve 4 is arranged upstream of the toilet 22. Thus, it can be checked separately whether the leak is in the area of the toilet. Obviously, the other tapping points can also be provided with their own second valve. A critical area of the distribution line 10, namely its deflection region, can be checked separately for leaks by two second valves 4 arranged flanking it. All valves and sensors are connected to the controller 5, even if this is not shown for all of them for reasons of clarity.

Alternatively, the consumers 2, 2' can be arranged in series one behind the other, not as shown in FIG. 1. In this case, the consumer line 11 extends over several floors. In principle, this corresponds to a consumer which comprises several tapping points connected in series, which are arranged on different floors.

If this line system is to be checked for leaks, a period is first determined in which no water is usually drawn by a user. For example, in a residential building between two and three o'clock at night. During this period, the first valve 1 is then closed, forming a closed pressure space in the liquid lines of the system. Subsequently, the pressure in the distribution line is measured over a period of time, for example 10 minutes. If no pressure drop is measured during this time, the pressure reduction rate is zero and the procedure is stopped. If the pressure reduction rate is too high, water withdrawal is assumed and the procedure is aborted. If the pressure reduction rate is within a plausible range, the second valve located downstream in the pipe system in the direction of flow is closed first. In the case shown, this is the second valve 4 of the last tapping point 22 in the consumer 2 on the top floor. If the determined pressure reduction rate is zero after closing this valve, the leak must be at the last tapping point 22. If the pressure reduction rate is essentially the same, the leak is in the line system upstream of this valve. Subsequently, the second valve 4 upstream of the consumer 2 on the top floor is closed. If the pressure reduction rate determined thereafter is zero, the leak is in this consumer, upstream of the last tapping point 22. If the pressure reduction rate is not zero, the leak must be in the distribution line (10) or in the consumer 2', 2" of one of the other two floors. By closing the second valves 4', 4", it can be determined analogously whether the leak must be in the respective consumer 2', 2" or in the distribution line 10. If it is determined that the leak must be in the distribution line 10, it can be determined by closing the second valves 4, in the direction of flow downstream and upstream of the deflection region, whether the leak must be in the area of the riser, in the deflection region or in the area between the deflection region and the first valve 1. If a pressure reduction rate is determined during the execution of the method, which indicates a withdrawal, the previously closed valve is opened again, closed again after a certain time and the determination of the corresponding pressure reduction rate is repeated. The flow sensor 7 can be used to determine the amount of water that has flowed during a withdrawal. In addition, it is possible to dispense with carrying out the method for detecting a leak if the flow sensor 7 indicates that a withdrawal is currently taking place. After detecting all flow rates, the result, i.e., the location of the leak, is displayed on a display unit of the control system. The display unit can be on site or can be wirelessly connected to the controller 5 of the control unit.

LIST OF REFERENCE NUMERALS

1 First valve
10 Distribution line
11 Consumer line
2 Consumer
20 Washbasin
21 Shower
22 WC
3 Pressure sensor
4 Second valve
5 Controller
6 Feed line
7 Flow sensor
PR1,2,3 Pressure reduction rate
SW1,2 Threshold value

The invention claimed is:

1. A method for detecting a leak in a line system having a distribution line (10), a first end of which can be closed with a first valve (1) and at a second end of which at least one consumer (2, 2') is arranged, the line system having a pressure sensor (3), with which a pressure in the distribution line (10) can be determined, and having at least one second valve (4, 4'), wherein the at least one second valve (4, 4') is arranged between the pressure sensor (3) and the at least one consumers (2, 2'), the method comprising the steps of:
  a) closing the first valve (1);
  b) determining a first pressure reduction rate (PR1);
  c) closing the at least one second valve (4, 4');
  d) determining a second pressure reduction rate (PR2);
  e) determining a region of the leak based on the determined pressure reduction rates (PR1, PR2).

2. The method according to claim 1, wherein the leak is located downstream of the at least one second valve (4, 4') when the first pressure reduction rate (PR1) is greater than a first threshold value (SW1) and the second pressure reduction rate (PR2) is less than a second threshold value (SW2), and wherein the leak is located upstream of the at least one second valve (4, 4') when the first pressure reduction rate (PR1) and the second pressure reduction rate (PR2) are greater than the first threshold value (SW1).

3. The method according to claim 2, wherein the method is stopped when the determined first pressure reduction rate (PR1) is greater than the second threshold value (SW2).

4. The method according to claim 1, wherein two or more consumers (2, 2') and two or more second valves (4, 4') are provided in the line system, wherein at least one further second valve (4) is provided between the pressure sensor (3) and each consumer (2, 2'), comprising the steps of:
  f) closing the at least one further second valve (4) after determining the second pressure reduction rate (PR2);
  g) determining a third pressure reduction rate (PR3) before determining the region of the leak.

5. The method according to claim 4, wherein the leak is located downstream of the at least one further second valve (4) when the previously determined pressure reduction rates (PR1, PR2) are greater than the first threshold value (SW1) and the third pressure reduction rate (PR3) is less than the second threshold value (SW2), and wherein the leak is located upstream of the at least one further second valve (4) when all pressure reduction rates (PR1, PR2, PR3) are greater than the first threshold value (SW1).

6. The method according to claim 4, wherein the previously closed valve (1, 4, 4') is reopened allow flow and closed again for detecting a leak at a later time when any of the determined pressure reduction rate (PR1, PR2, PR3) exceeds a predetermined value.

7. The method according to claim 6, wherein before being closed again, the corresponding valve (1, 4, 4') remains open for a predetermined time.

8. The method according to claim 7, wherein a flow sensor is provided in the line system, and wherein the predetermined time is determined based on a flow previously determined by the flow sensor.

9. The method according to claim 1, wherein the execution of the method is carried out in a predetermined period of time.

10. The method according to claim 1, wherein the method is performed at predetermined intervals.

11. The method according to claim 1, wherein each consumer (2, 2') comprises a plurality of tapping points (20, 21, 22) and the at least one second valve (4, 4') is arranged upstream of each tapping point (20, 21, 22) and wherein in each consumer line (11) the respective second valve (4, 4') arranged most downstream is closed first and subsequently a valve (4, 4') adjoining in the direction of the pressure sensor (3) is closed.

12. The method according to claim 1, wherein a plurality of second valves (4, 4') are provided in the distribution line (10) between the at least one consumer (2, 2') and the pressure sensor (3), and wherein in the distribution line (10), the second valve (4) arranged most downstream is closed first and subsequently the second valve (4) adjoining in the direction of the pressure sensor (3) is closed.

13. A method for detecting a leak in a line system having a distribution line (10), a first end of which can be closed with a first valve (1) and at a second end of which at least one consumer (2, 2') is arranged, the line system having a pressure sensor (3), with which a pressure in the distribution line (10) can be determined, and having at least one second valve (4, 4'), wherein the at least one second valve (4, 4') is arranged between the pressure sensor (3) and at least one of the consumers (2, 2), the method comprising the steps of:
   a) closing all valves (1,4,4');
   b) determining a first pressure reduction rate (PR1);
   c) opening the at least one second valve (4,4');
   d) determining a second pressure reduction rate (PR2);
   e) determining the region of the leak based on the determined pressure reduction rates (PR1, PR2).

14. The method according to claim 13, wherein the leak is located upstream of the at least one second valve (4,4') when the first pressure reduction rate (PR1) is greater than a first threshold value (SW1), and wherein the leak is located downstream of the at least one second valve (4,4') when the first pressure reduction rate (PR1) is less than the first threshold value (SW1) and the second pressure reduction rate (PR2) is greater than the first threshold value (SW1).

15. A control system for detecting a leak in a line system having a distribution line (10), a first end of which can be closed with a first valve (1) and at a second end of which at least one consumer (2, 2') is arranged, the line system having a pressure sensor (3), with which a pressure in the distribution line (10) can be determined, and having at least one second valve (4,4'), wherein the at least one second valve (4, 4') is arranged between the pressure sensor (3) and each consumer (2, 2'), wherein the first valve (1), the at least one second valve (4, 4') and the pressure sensor (3) are connected to a controller (5), wherein the controller (5) is configured to close the first valve (1), determine a first pressure reduction rate (PR1), close the at least one second valve (4, 4'), determining a second pressure reduction rate (PR2) and determine the a region of the leak based on the determined pressure reduction rates (PR1, PR2).

16. The control system according to claim 15, wherein connection between the first valve (1), the at least one second valve (4,4'), the pressure sensor (3) and the controller (5) is wired or wireless.

17. The control system according to claim 15, comprising a display unit with which the region of the leak can be displayed.

18. The control system according to claim 15, comprising a transmission unit with which information can be transmitted away from or to the control system.

19. A valve unit for detecting a leak in a line system, wherein the valve unit comprises a first valve (1) and a control system according to claim 15.

20. The valve according to claim 19, wherein the valve unit comprises a pressure sensor (3) or a pressure sensor (3) and a flow sensor (7).

* * * * *